United States Patent
Sudou et al.

(10) Patent No.: US 6,771,024 B2
(45) Date of Patent: Aug. 3, 2004

(54) FLUORESCENT LAMP

(75) Inventors: Masatoshi Sudou, Shiga (JP); Toshiyoshi Oga, Shiga (JP); Masaru Saitoh, Kyoto (JP); Toshifumi Kondoh, Kagawa (JP)

(73) Assignee: Matsushita Electric-Industrial Co., Ltd., Osaka (JP)

( * ) Notice: Subject to any disclaimer, the term of this patent is extended or adjusted under 35 U.S.C. 154(b) by 0 days.

(21) Appl. No.: 10/451,356
(22) PCT Filed: Dec. 10, 2001
(86) PCT No.: PCT/JP01/10818
§ 371 (c)(1),
(2), (4) Date: Sep. 10, 2003
(87) PCT Pub. No.: WO02/50869
PCT Pub. Date: Jun. 27, 2002

(65) Prior Publication Data
US 2004/0095072 A1 May 20, 2004

(30) Foreign Application Priority Data
Dec. 20, 2000 (JP) ........................ 2000-386652

(51) Int. Cl.[7] ............................. H01J 13/46; H01J 1/62
(52) U.S. Cl. .......................... 315/56; 313/485; 313/493
(58) Field of Search ............................. 315/56, 59, 64; 313/483, 485, 493, 512, 283–285; 445/66, 67, 69, 72

(56) References Cited

U.S. PATENT DOCUMENTS

| | | | | |
|---|---|---|---|---|
| 4,545,774 A | * | 10/1985 | Van Gils et al. | 445/22 |
| 4,710,679 A | * | 12/1987 | Budinger et al. | 315/58 |
| 4,786,841 A | * | 11/1988 | Fohl et al. | 313/493 |
| 5,055,738 A | * | 10/1991 | Yorifuji et al. | 313/490 |
| 5,090,931 A | * | 2/1992 | Shiraishi | 445/22 |
| 6,417,615 B1 | * | 7/2002 | Yasuda et al. | 313/490 |
| 6,515,412 B1 | * | 2/2003 | Ishitsuka et al. | 313/491 |

FOREIGN PATENT DOCUMENTS

| | | | |
|---|---|---|---|
| JP | 57-40850 | * | 3/1982 |
| JP | 58-121542 | * | 7/1983 |
| JP | 60-95846 | * | 5/1985 |
| JP | 4-98754 | * | 3/1992 |
| JP | 8-315722 | * | 11/1996 |
| JP | 10-302719 | * | 11/1998 |

OTHER PUBLICATIONS

Yamane et al., "Mechanism of Two Channel Discharges in a Low Pressure Mercury Vapor Lamp", Journal of the Illuminating Engineering Institute of Japan, vol. 63, No. 9, 1979 pp. 19–25.*

Young, et al., "A compact partition fluorescent lamp", Lighting Design & Application, May 1980, pp. 38–42.*

* cited by examiner

Primary Examiner—Thuy Vinh Tran
(74) Attorney, Agent, or Firm—Merchant & Gould P.C.

(57) ABSTRACT

A fluorescent lamp includes two glass outer tubes (6, 7), a bridge junction (8), and first glass inner tubes (9, 10). One end of each of the glass outer tubes is closed, and the other end is sealed with stems (4, 5) for supporting electrodes (13). A phosphor is applied to the inside surface of each of the glass outer tubes. The bridge junction connects the glass outer tubes at the other end portion to form a discharge space inside the glass outer tubes. The first glass inner tubes are provided in the glass outer tubes, respectively. A phosphor is applied to the surface of each of the first glass inner tubes. One end of each of the first glass inner tubes is open and disposed at the closed ends of the glass outer tubes, and the other end is sealed with the tips of the stems so that the electrodes are positioned in the first glass inner tubes.

5 Claims, 11 Drawing Sheets

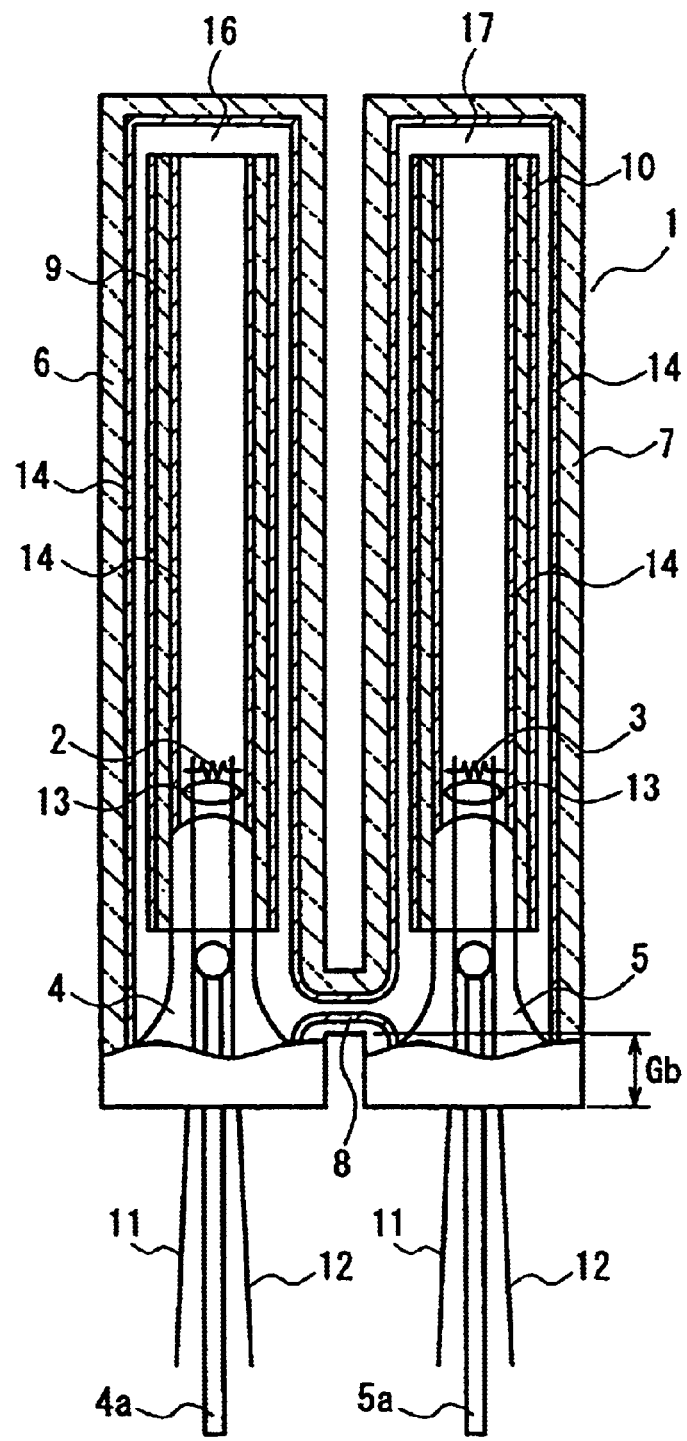
F I G. 1

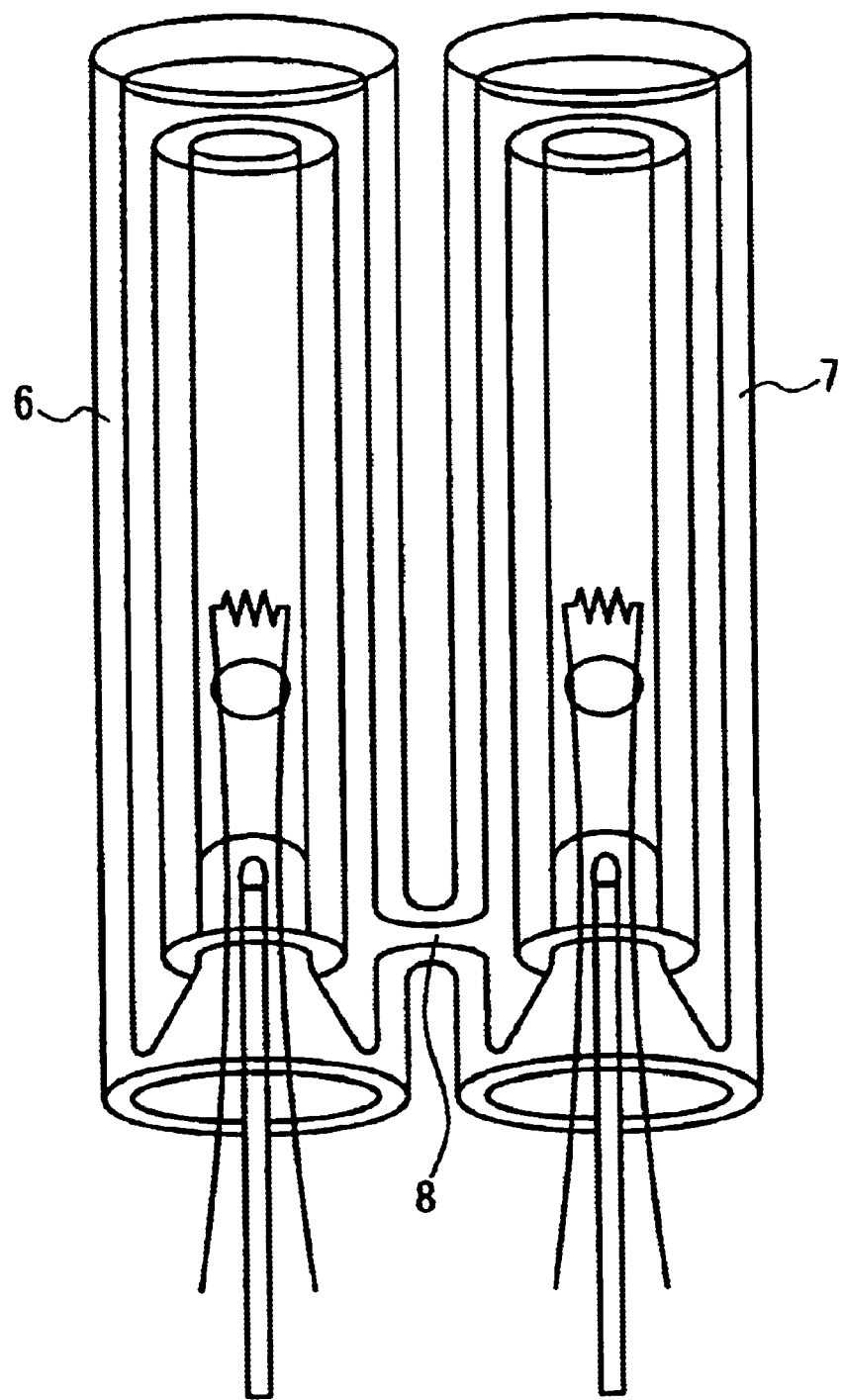
F I G. 7

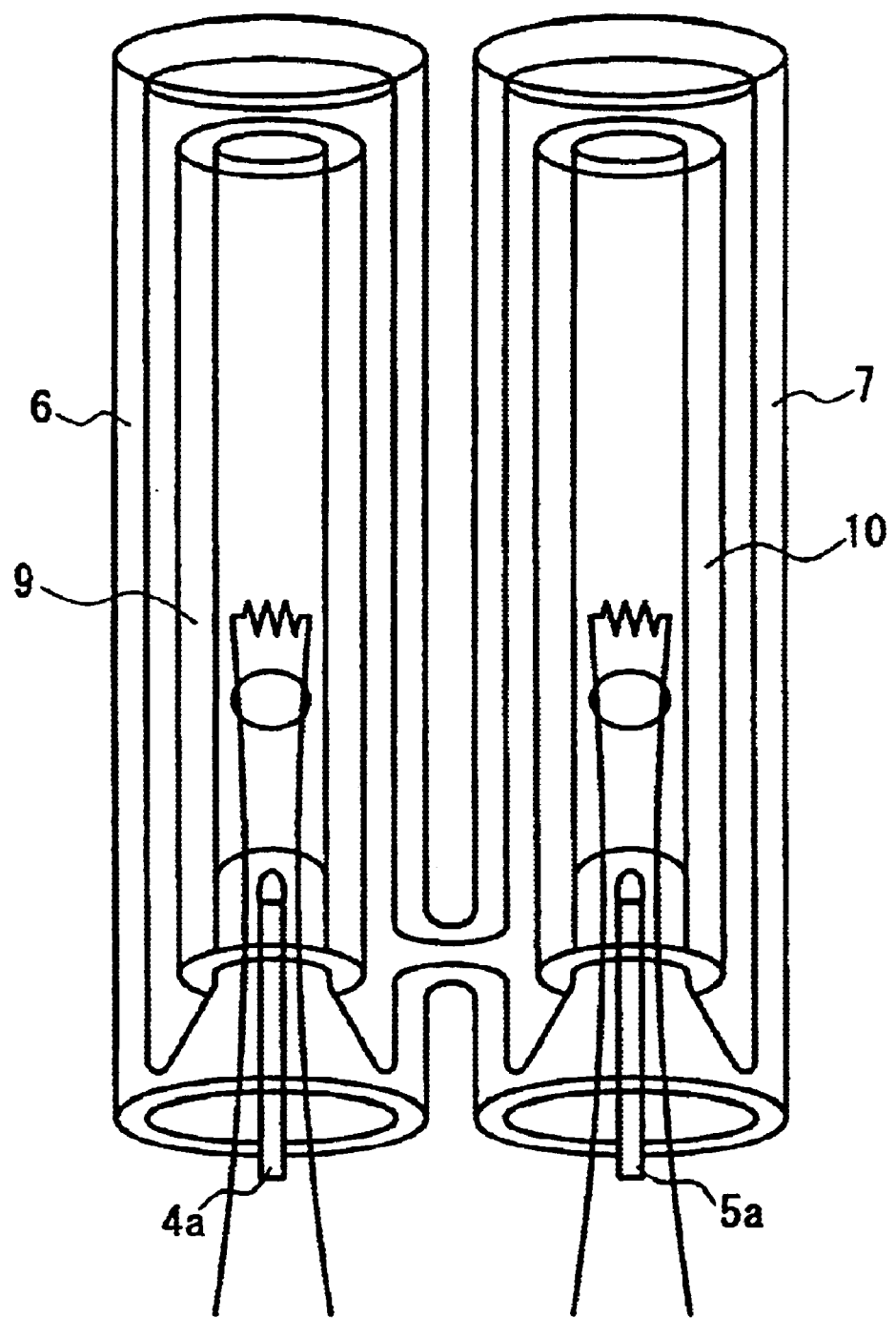
F I G. 8

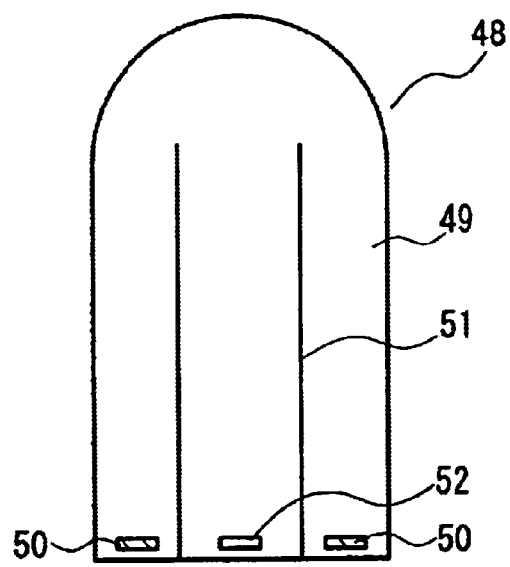
F I G. 1 3 A
PRIOR ART
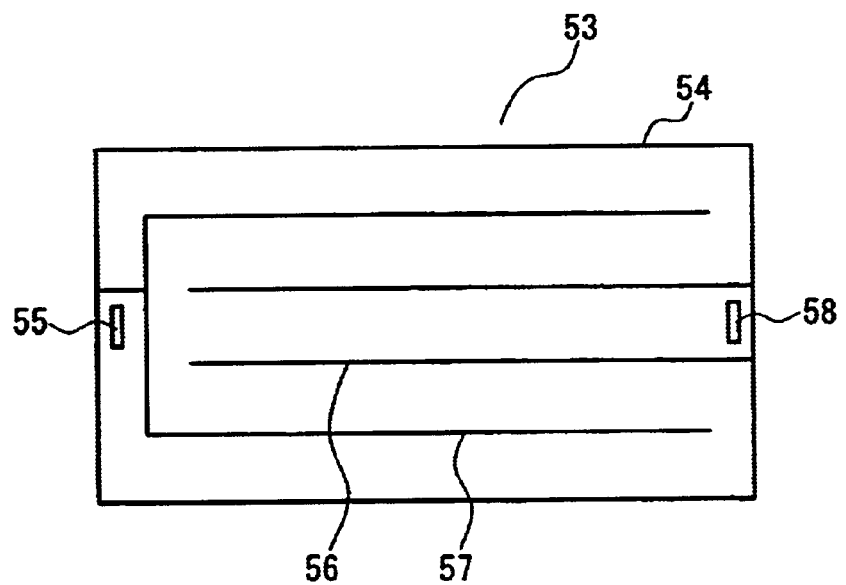
F I G. 1 3 B
PRIOR ART

US 6,771,024 B2

FLUORESCENT LAMP

TECHNICAL FIELD

The present invention relates to the configuration of a fluorescent lamp. In particular, the present invention relates to the configuration of a fluorescent lamp that can achieve a smaller lamp shape for the same lamp characteristics.

BACKGROUND ART

FIG. 10 shows a light-emitting tube 27 used in a conventional compact fluorescent lamp. The light-emitting tube 27 includes two straight glass tubes 32, 33. One end of each of glass tubes 32, 33 is closed, and the other end is sealed with stems 31 for supporting electrodes 29, 30, respectively. The glass tubes 32, 33 are connected at the one end portion by a bridge junction 34. A discharge space is formed in the light-emitting tube 27 through the bridge junction 34. A phosphor 28 is applied to the inside surface of each of the glass tubes 32, 33. The light-emitting tube 27 is filled with mercury and a buffer inert gas. A resin base 35 is attached to the end of the light-emitting tube 27 on the stem side, thus providing a so-called single-base compact fluorescent lamp as a finished product.

The conventional compact fluorescent lamp as mentioned above has a small lamp shape and is characterized by high efficiency and long life.

For example, a 36W type compact fluorescent lamp as shown in FIG. 10, which is a major product for a supply voltage of 200V, has a lamp length of 410 mm. This is about one third of the lamp length (1198 mm) of a 40W type straight fluorescent lamp whose luminous flux is substantially the same as that of the 36W type compact fluorescent lamp. The 36W type compact fluorescent lamp can have the lamp characteristics such as a luminous flux of 2900 lm, a lamp efficiency of 80.5 lm/W, and a lamp life of 9000 hrs. The tube outer diameter of the compact fluorescent lamp is reduced to 20 mm compared with 32 mm for the 40W type straight fluorescent lamp. The discharge path length (i.e., a distance between the electrodes) of the compact fluorescent lamp also is reduced to about 730 mm compared with about 1100 mm for the 40W type straight fluorescent lamp. Both the compact fluorescent lamp and the straight fluorescent lamp have a lamp current of 430 mA.

A 96W type compact fluorescent lamp has a lamp length of 860 mm, which is about one third of the lamp length (2367 mm) of a 110W type straight fluorescent lamp whose luminous flux is substantially the same as that of the 96W type compact fluorescent lamp. The 96W type compact fluorescent lamp can have the lamp characteristics such as a luminous flux of 8600 lm, a lamp efficiency of 89.6 lm/W, and a lamp life of 7500 hrs. The tube outer diameter is 22 mm, and the lamp current is 820 mA.

While the compact fluorescent lamps as mentioned above are made smaller than the conventional straight fluorescent lamps, they are still larger than the incandescent lamps that are almost point light source or high-pressure discharge lamps. A further reduction in size of a compact fluorescent lamp makes it possible to design a smaller lighting fixture that can facilitate light distribution control with high efficiency, which may further improve energy saving and lighting design quality. However, there is a limit to such a reduction in lamp shape of the conventional compact fluorescent lamps because they use a bending or junction process to form a continuous discharge path inside the glass tubes as described above.

Before developing the conventional compact fluorescent lamps, various kinds of light-emitting tube configurations were proposed.

For example, FIG. 11 schematically shows the configuration of a light-emitting tube used in a so-called internally partitioned lamp (R. G. Young et al., "A compact partition fluorescent lamp," Lighting Design & Application, May 1980, pp. 38–42). A light-emitting tube 36 includes a straight glass tube 37 wherein the inside surface is coated with a phosphor. The internal space of the straight glass tube 37 is divided by insulating walls 38 into a plurality of portions so as to provide a continuous discharge path. A pair of electrodes 39, 40 are located at the ends of the discharge path, respectively. This configuration can achieve a smaller lamp shape.

FIG. 12 schematically shows the configuration of a light-emitting tube used in a so-called multi-arc lamp (Mikiya YAMANE et al., "Shunt mechanism for a discharge tube having two discharge paths," Journal of the Illuminating Engineering Society, vol. 63, No. 9 (1979), pp. 19–25). In a light-emitting tube 41, a glass stem 43 is provided at one end of a glass bulb 41 so as to seal and support the end of a glass inner tube 44. An electrode 45 that functions as a cathode is attached inside the glass inner tube 44 by the glass stem 43. Two electrodes 46, 47 that function as an anode are attached near the one end of the glass bulb 42. This lump is turned on by the application of a direct current, and two discharge arcs are generated between the cathode 45 and each of the anodes 46, 47.

FIGS. 13A and 13B schematically show two configurations of light-emitting tubes used in a multiple-tube fluorescent lamp disclosed by JP 8(1996)-315772 A. A light-emitting tube 48 in FIG. 13A has a double-tube structure in which the necessary portion of an envelope 49 is coated with a phosphor, two external electrodes 50 are provided at the bottom, a transparent inner tube 51 that transmits ultraviolet rays is placed in the envelope 49, and an internal electrode 52 is provided at the bottom of the transparent inner tube 51. A light-emitting tube 53 in FIG. 13B has a triple-tube structure in which the necessary portion of an envelope 54 is coated with a phosphor, an external electrode 55 is provided at the bottom, double transparent inner tubes 56, 57 that transmit ultraviolet rays are placed in the envelope 54, and an internal electrode 58 is provided at the bottom of the transparent inner tube 56.

The studies conducted by the present inventors on various compact fluorescent lamps proposed so far with the above configurations show that it is very difficult to make those compact fluorescent lamps commercially available as products. For example, the lamp configuration in FIG. 11 cannot reliably prevent a so-called discharge crosstalk between adjacent discharge paths that are partitioned by the insulating wall 38. The lamp configuration in FIG. 12 cannot easily achieve high efficiency in the lamp characteristics, and also has a limit of providing a smaller lamp shape. The lamp configuration in FIG. 13A cannot easily achieve high efficiency in the lamp characteristics. For this configuration, it is more difficult to place the ultraviolet-ray transmitting inner tube 51 in the envelope 49, the inner tube 51 using a different glass material from that of the envelope 49. Similarly, for the lamp configuration in FIG. 13B, it is much more difficult to place the double inner tubes 56, 57 in the envelope 54, the double inner tubes 56, 57 using a different glass material from that of the envelope 54.

Therefore, to improve energy saving and lighting design quality by promoting the spread of compact fluorescent lamps, it is a major challenge to find a novel lamp configuration that can achieve a much smaller lamp shape than the conventional technique.

DISCLOSURE OF INVENTION

It is an object of the present invention to provide a compact fluorescent lamp that can achieve a much smaller lamp shape without degrading the lamp characteristics and contribute to further improvements in energy saving lighting and lighting design quality.

A fluorescent lamp of the present invention includes two glass outer tubes, a bridge junction, and first glass inner tubes. One end of each of the glass outer tubes is closed, and the other end is sealed with stems for supporting electrodes, respectively. A phosphor is applied to the inside surface of each of the glass outer tubes. The bridge junction connects the glass outer tubes at the other end portion to form a discharge space inside the glass outer tubes. The first glass inner tubes are provided in the glass outer tubes, respectively. A phosphor is applied to the surface of each of the first glass inner tubes. One end of each of the first glass inner tubes is open and disposed at the closed ends of the glass outer tubes, and the other end is sealed with the tips of the stems so that the electrodes are positioned in the first glass inner tubes.

This configuration allows a fluorescent lamp to have a much shorter and smaller lamp shape as well as better lamp characteristics than a conventional compact fluorescent lamp.

Another fluorescent lamp of the present invention includes two glass outer tubes, a bridge junction, first glass inner tubes, and second glass inner tubes. One end of each of the glass outer tubes is closed, and the other end is sealed with stems for supporting electrodes, respectively. A phosphor is applied to the inside surface of each of the glass outer tubes. The bridge junction connects the glass outer tubes at the one end portion to form a discharge space inside the glass outer tubes. The first glass inner tubes are provided in the glass outer tubes, respectively. A phosphor is applied to the surface of each of the first glass inner tubes. The second glass inner tubes are provided in the glass outer tubes so that the first glass inner tubes are inserted into the second glass inner tubes, respectively. A phosphor is applied to the surface of each of the second glass inner tubes. One end of each of the first glass inner tubes is open and disposed at the closed ends of the glass outer tubes, and the other end is sealed with the tips of the stems so that the electrodes are positioned in the first glass inner tubes. The ends of the second glass inner tubes are open at least on the stem side.

This configuration further can reduce the length and size of a lamp shape as compared with the above configuration.

In this configuration, it is preferable that protrusions are formed at the insides of the closed ends of the glass outer tubes, and the other ends of the second glass inner tubes are sealed with the protrusions.

In the above configurations, it is preferable that the glass inner tubes are disposed eccentrically from the central axes of the glass outer tubes toward the bridge junction. This deviation forms a small discharge space on the bridge junction side and a large space on the opposite side, so that a discharge is caused to occur easily in the large space. Therefore, the brightness of light emitted from the outside surface of a light-emitting tube, i.e., the portion of the glass outer tubes other than the surfaces that are opposed to each other via the bridge junction can be increased as compared with a configuration in which the glass inner tubes and the glass outer tubes are arranged coaxially. Further, a discharge loss is suppressed.

BRIEF DESCRIPTION OF DRAWINGS

FIG. 7 is a perspective view showing a manufacturing process of the light-emitting tube.

FIG. 8 is a perspective view showing a manufacturing process of the light-emitting tube.

FIG. 11 is a perspective view showing another conventional fluorescent lamp.

FIG. 12 is a front view showing yet another conventional fluorescent lamp.

FIG. 13A is a conceptual diagram showing still another conventional fluorescent lamp.

FIG. 13B is a conceptual diagram showing still another conventional fluorescent lamp.

BEST MODE FOR CARRYING OUT THE INVENTION

Hereinafter, embodiments of the present invention will be described with reference to the drawings.

First Embodiment

Figure 2:
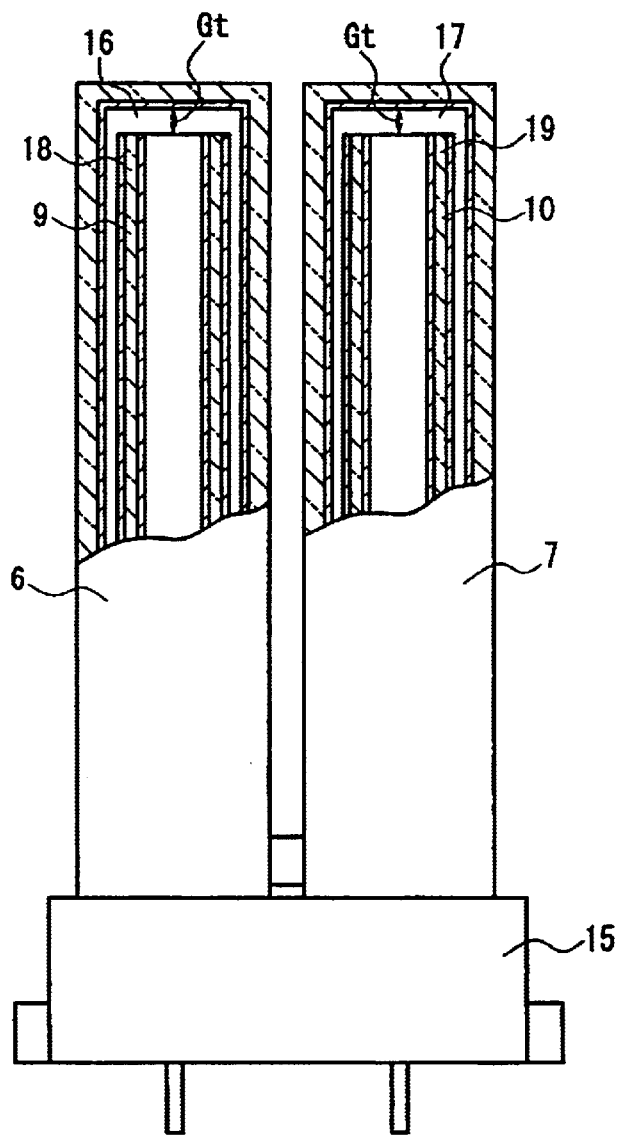
FIG. 2 is a partial cutaway external view showing the light-emitting tube.
Figure 3:
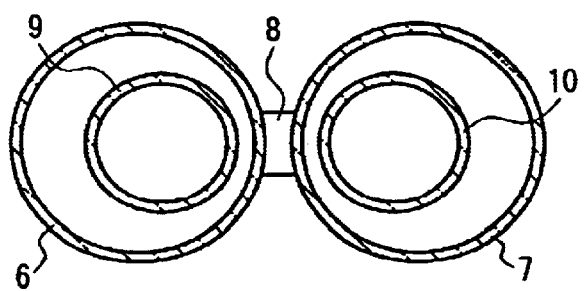
FIG. 3 is a cross-sectional plan view schematically showing the positional relationship between glass inner tubes and glass outer tubes of the light-emitting tube.
Figure 1:
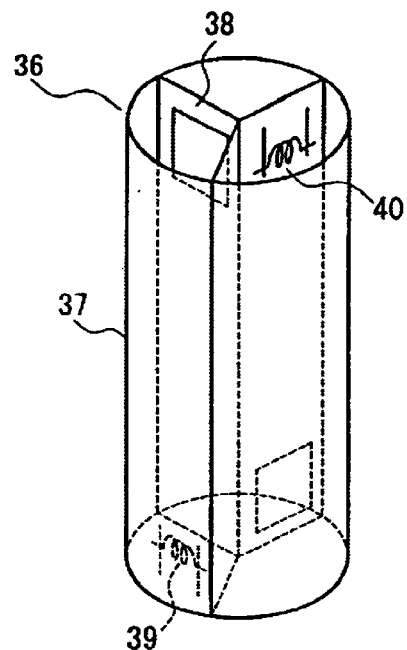
FIG. 1 is a cross-sectional view showing a light-emitting tube of a compact fluorescent lamp according to a first embodiment of the present invention.
Figure 1:
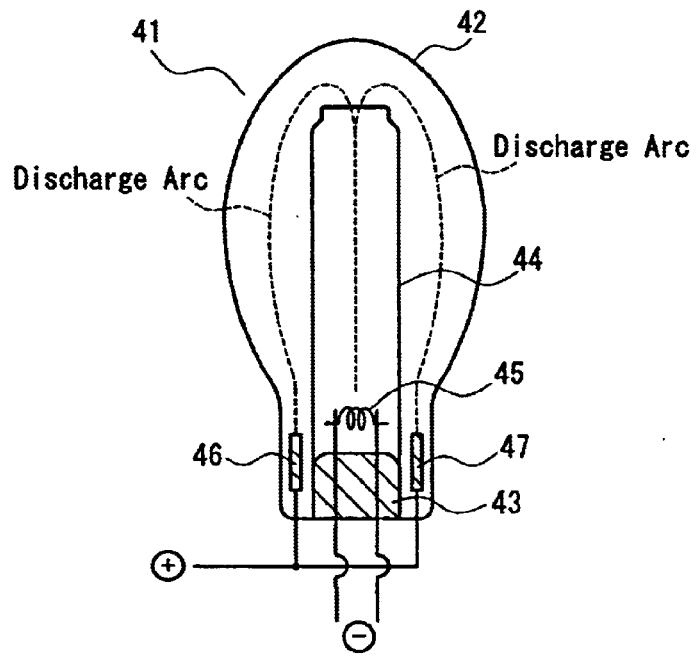

FIGS. 1 to 3 show a light-emitting tube 1 of a compact fluorescent lamp according to a first embodiment of the present invention. The light-emitting tube 1 includes two straight glass outer tubes 6, 7 made of alkaline-earth silicate glass. One end of each of the glass outer tubes 6, 7 is closed, and the other end is open and sealed with stems 4, 5. The stems 4, 5 are made of alkaline-earth silicate glass and support tungsten filament electrodes 2, 3. The glass outer tubes 6, 7 are connected at the surfaces near the stems 4, 5 by a bridge junction 8 that is formed of a bridge connection. A discharge space is formed in the light-emitting tube 1 through the bridge junction 8. Reference numerals 4a, 5a denote exhaust tubes of the stems 4, 5.

Two straight first glass inner tubes 9, 10 made of alkaline-earth silicate glass are arranged in the glass outer tubes 6, 7, respectively. One end (upper side of FIG. 1) of each of the glass inner tubes 9, 10 is open and opposed to the closed ends of the glass outer tubes 6, 7. The other end (the lower side of FIG. 1) of each of the glass inner tubes 9, 10 is sealed by pressing the tips of the stems 4, 5 into the glass inner tubes.

As shown in FIG. 3, the glass inner tubes 9, 10 are disposed eccentrically from the central axes of the glass outer tubes 6, 7 toward the bridge junction 8. This deviation forms a small discharge space on the bridge junction side and a large space on the opposite side, so that a discharge is caused to occur easily in the large space. Therefore, the brightness of light emitted from the outside surface of the light-emitting tube 1, i.e., the portion of the glass outer tubes 6, 7 other than the surfaces that are opposed to each other via the bridge junction 8 can be increased as compared with a configuration in which the glass inner tubes and the glass outer tubes are arranged coaxially. Further, a discharge loss is suppressed. It is noted that electrodes, phosphors, etc. are not illustrated in FIG. 3, since FIG. 3 is intended to show the positional relationship between the glass inner tubes 9, 10 and the glass outer tubes 6, 7.

As shown in FIG. 1, two lead wires 11, 12 are sealed in each of the stems 4, 5. Electrodes 2, 3 are mounted between the pairs of lead wires 11, 12 at their end portions, respectively. The lead wires 11, 12 are fixed by glass beads 13.

A rare-earth phosphor 14 that is obtained by mixing $Y_2O_3$:Eu for red, $LaPO_4$:Ce, Tb for green, and $BaMg_2Al_{16}O_{27}$:Eu for blue is applied to the main portions of the inside surfaces of the glass outer tubes 6, 7 and the inside and outside surfaces of the glass inner tubes 9, 10.

The light-emitting tube 1 is filled with excess mercury and an argon-based buffer inert gas in an amount of 250 to 550 Pa. The electrodes 2, 3 are filled with an electron emission material. As shown in FIG. 2, a resin base 15 is attached to the ends of the glass outer tubes 6, 7 on the stem side, thus providing a so-called single-base fluorescent lamp.

The compact fluorescent lamp of this embodiment has a discharge path that connects the internal spaces of the glass outer tubes 6, 7 through the bridge junction 8. Therefore, the passage of a discharge in the light-emitting tube 1 is as follows: the electrode 2—the glass inner tube 9—a gap between the glass outer tube 6 and the glass inner tube 9—the bridge junction 8—a gap between the glass outer tube 7 and the glass inner tube 10—the glass inner tube 10—the electrode 3. In other words, the compact fluorescent lamp of this embodiment can have a longer discharge path for the same lamp length as that of the conventional compact fluorescent lamp in FIG. 10, so that the brightness can be increased. Moreover, when the brightness is the same, the compact fluorescent lamp of this embodiment can be about half the lamp length of the conventional lamp, thus achieving a further reduction in length and size.

This embodiment allows coldest points to be provided in the vicinity of the closed ends 16, 17 of the glass outer tubes 6, 7 of the light-emitting tube 1. A coldest point temperature determines a mercury vapor pressure in the light-emitting tube 1 during lamp operation. In this case, a distance (represented by Gt (mm) in FIG. 2) between the end 16 (17) of the glass outer tube 6 (7) and the end 18 (19) of the glass inner tube 9 (10) is adjusted to control the coldest point temperature in the optimum temperature range (about 50° C. for a thin compact fluorescent lamp) under which the maximum luminous flux of the lamp can be obtained.

The studies conducted by the present inventors show that when the distance Gt (mm) is given by $0.5\,Do \leq Gt\,(mm) \leq 1.5\,Do$, where Do (mm) represents the tube outer diameter of the glass outer tubes 6, 7, the coldest point temperature can be controlled to the optimum temperature (about 50° C.).

The light-emitting tube 1 of this embodiment is manufactured, e.g., in the following manner.

Figure 4:
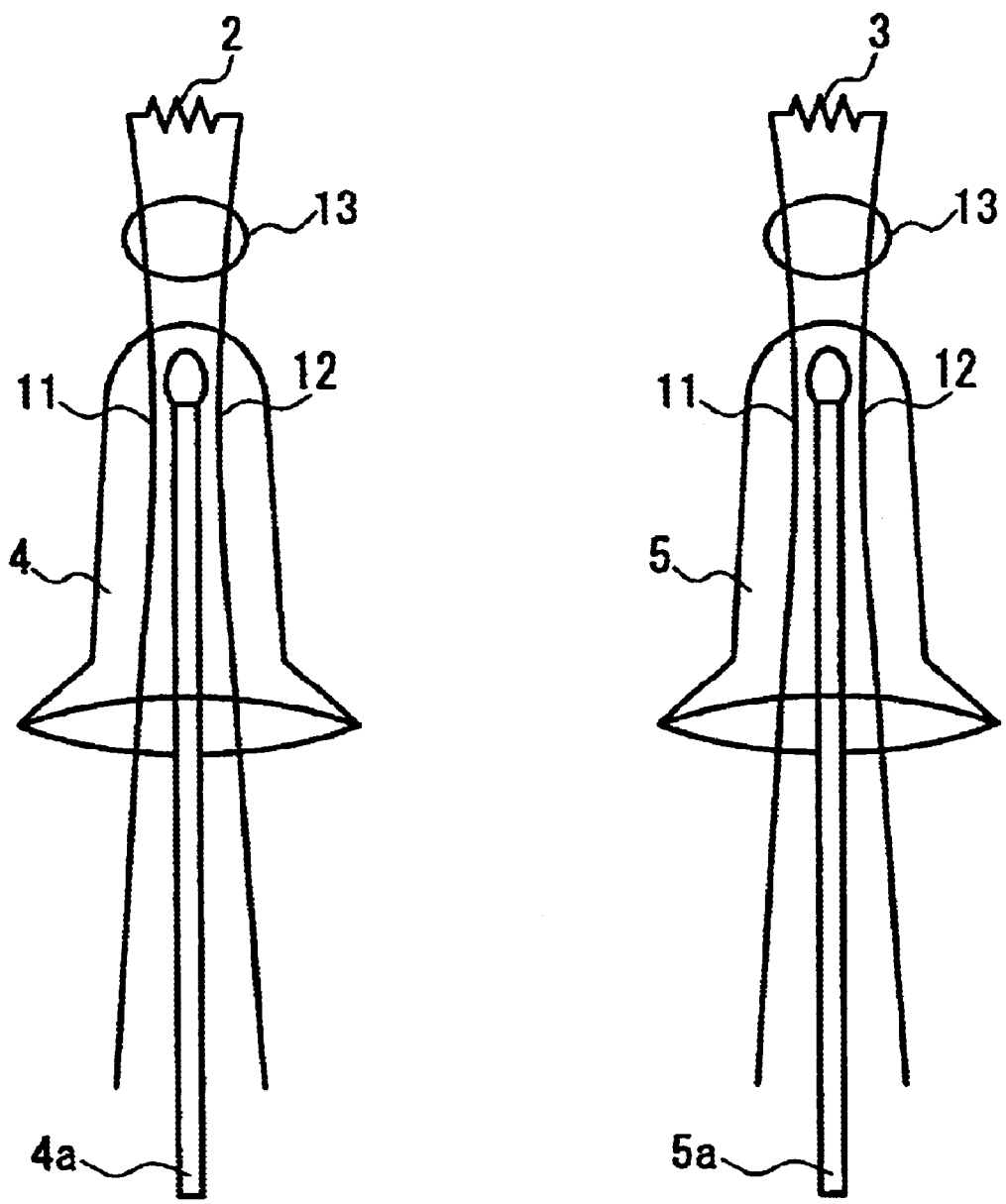
FIG. 4 is a perspective view showing a manufacturing process of the light-emitting tube.
Figure 5:
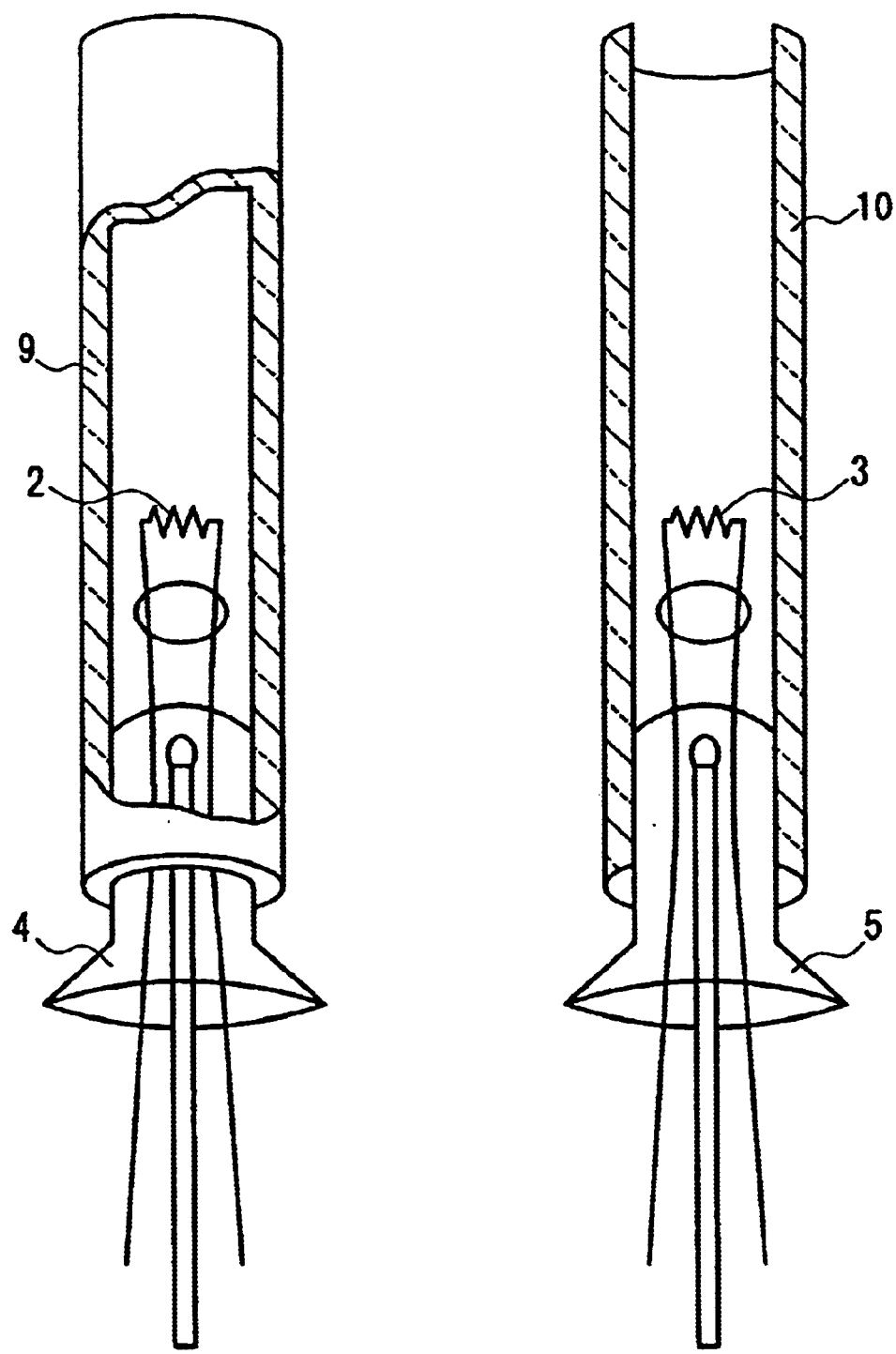
FIG. 5 is a perspective view showing a manufacturing process of the light-emitting tube.
Figure 6:
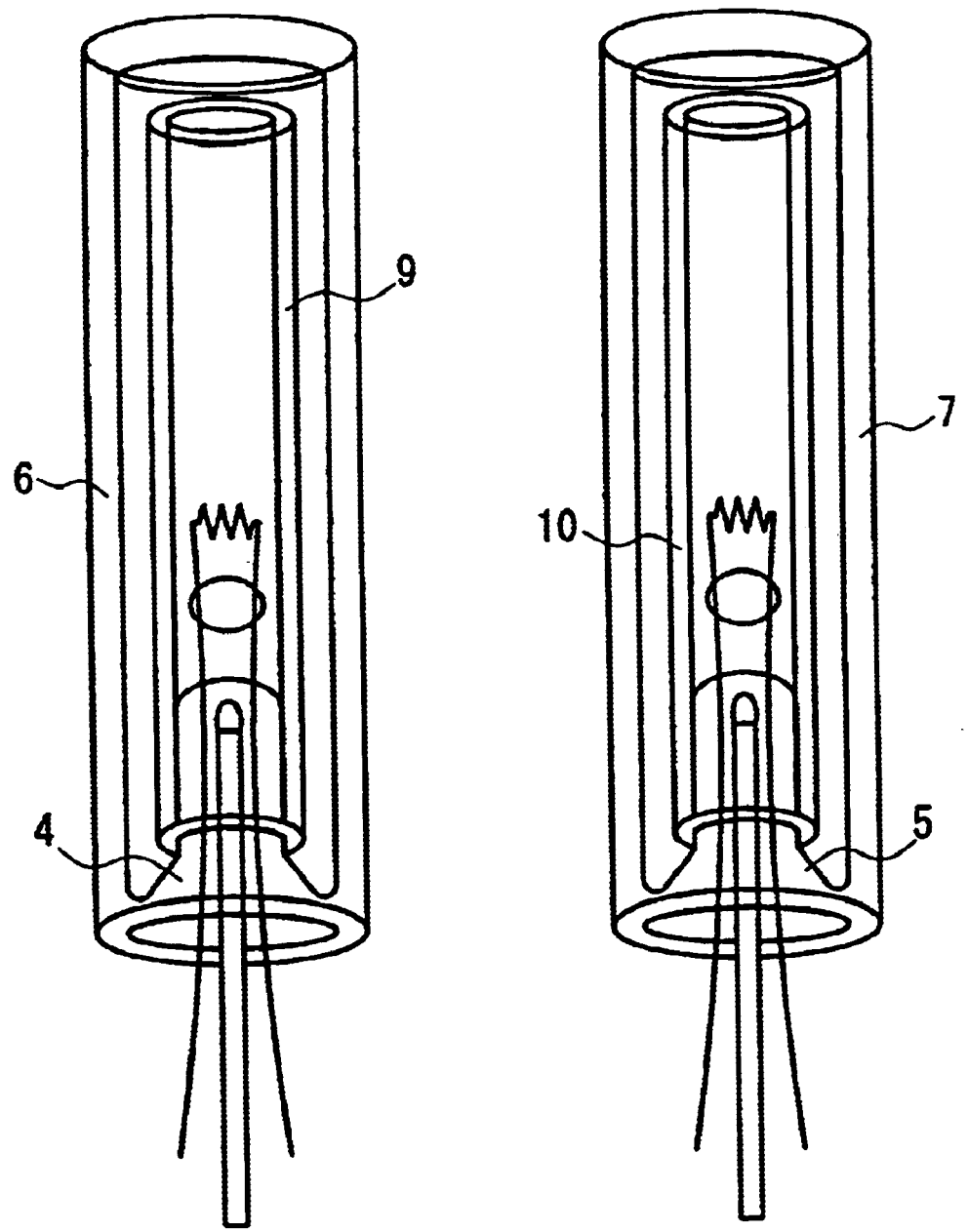
FIG. 6 is a perspective view showing a manufacturing process of the light-emitting tube.

As shown in FIG. 4, the electrodes 2, 3 are mounted between the pairs of lead wires 11, 12 that are fixed by the glass beads 13. The pairs of lead wires 11, 12 are sealed in the stems 4, 5, respectively. As shown in FIG. 5, the tips of the stems 4, 5 are pressed into the glass inner tubes 9, 10, wherein the inside and outside surfaces are coated with the phosphor 14, thereby sealing the other ends of the glass inner tubes. As shown in FIG. 6, the open ends of the glass outer tubes 6, 7, wherein the inside surfaces are coated with the phosphor 14, are sealed with the flared portions of the stems 4, 5, while the opposite ends are closed. As shown in FIG. 7, the glass outer tubes 6, 7 are connected at the end portions on the stem side by the bridge junction 8 of a bridge connection. The light-emitting tube 1 is evacuated through the exhaust tubes 4a, 5a of the stems 4, 5, and then filled with mercury and a buffer inert gas. As shown in FIG. 8, the exhaust tubes 4a, 5a are sealed and cut.

For the purpose of showing the internal structure, FIGS. 5 to 8 do not illustrate the phosphor 14. FIGS. 1, 2 and 5 show the glass outer tubes 6, 7 as being opaque to make them apparent. Actually, however, the glass outer tubes are transparent.

Figure 10:
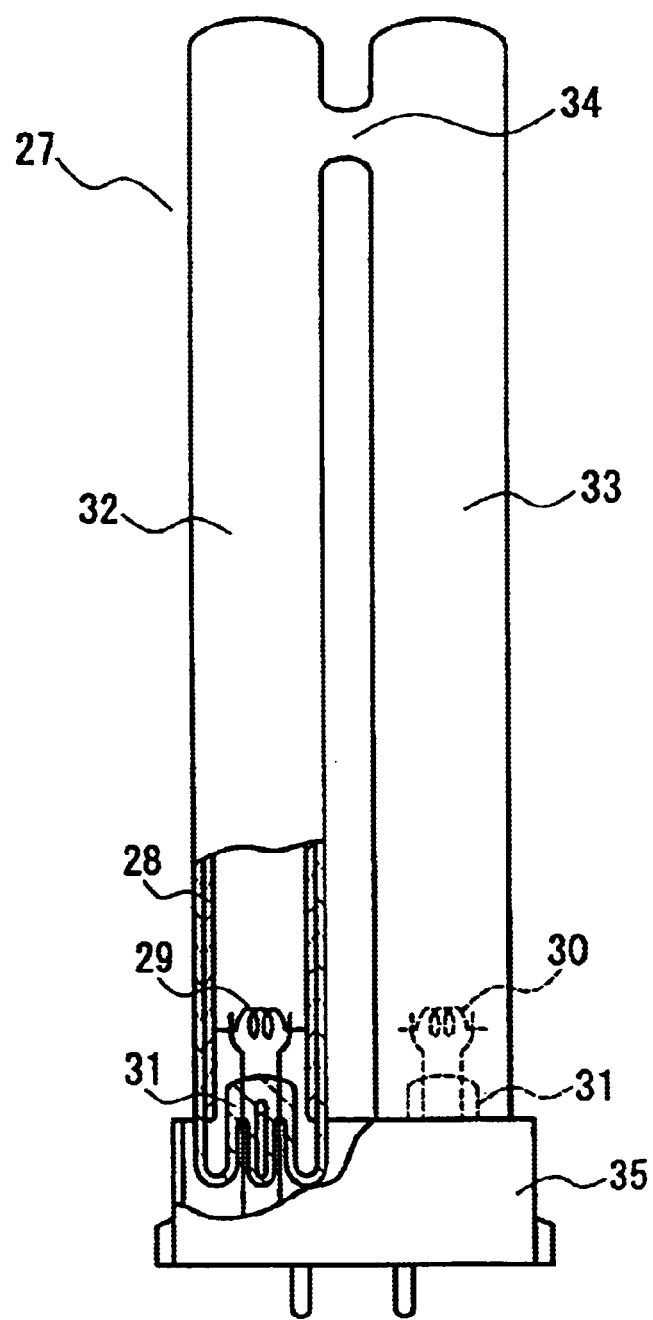
FIG. 10 is a partial cutaway front view showing a conventional compact fluorescent lamp.

The following is an explanation about a result of measuring the characteristics of a 36W type fluorescent lamp produced according to the present invention (referred to as a "lamp of the invention"). A light-emitting tube 1 of the lamp of the invention was formed of components with the following dimensions. Glass outer tubes 6, 7 have a tube outer diameter Do of 20 mm (a tube inner diameter of 18 mm) and a tube length of 240 mm. Glass inner tubes 9, 10 have a tube outer diameter of 12 mm (a tube inner diameter of 10.4 mm) and a tube length of 200 mm. A distance Gt was set to 20 mm. A distance Gb (see FIG. 1) between a bridge junction 8 and the ends of the glass outer tubes 6, 7 sealed with stems was set to 20 mm. The light-emitting tube 1 was filled with Ar as a buffer inert gas in an amount of 400 Pa. The lamp including a resin base 15 has a length of 250 mm. The discharge path length of the light-emitting tube 1 having the above dimensions is about 780 mm. Therefore, the lamp of the invention can make the discharge path about 50 mm longer than the discharge path (about 730 mm) of a conventional 36W type compact fluorescent lamp as shown in FIG. 10, though the size of the two lamps is the same.

The 36W type lamp of the invention was operated horizontally by a special electronic ballast at a frequency of 49 kHz, and then the lamp characteristics were measured. The measurement shows that the lamp of the invention can exhibit more excellent lamp characteristics than the conventional compact fluorescent lamp, having a luminous flux of 3100 lm and a lamp efficiency of 86.1 lm/W. The lamp of the invention also can achieve the same lamp life (9000 hrs) as that of a conventional 36W type lamp without any problem.

In this case, the lamp current was decreased to 300 mA, which is about two thirds of the lamp current (430 mA) of the conventional 36W type lamp. This effect is derived basically from the following two conditions:

(a) The discharge path of the light-emitting tube 1 can be made longer as described above; and (b) The configuration of the light-emitting tube of this embodiment inevitably leads to a reduction in effective cross section of the discharge path.

The potential gradient in a positive column of the lamp is raised under the condition (b). Thus, the combination of a rise in potential gradient and a longer discharge path achieved under the condition (a) can increase a lamp voltage. Such a decrease in lamp current can suppress the saturation of luminous flux due to the lamp current, which in turn contributes to an improvement in lamp efficiency.

The observation shows that during the steady state operation of the lamp, a substantially uniform discharge plasma is formed particularly even in the gaps between the glass outer tubes 6, 7 and the glass inner tubes 9, 10 in the circumferential direction.

Second Embodiment

Figure 9:
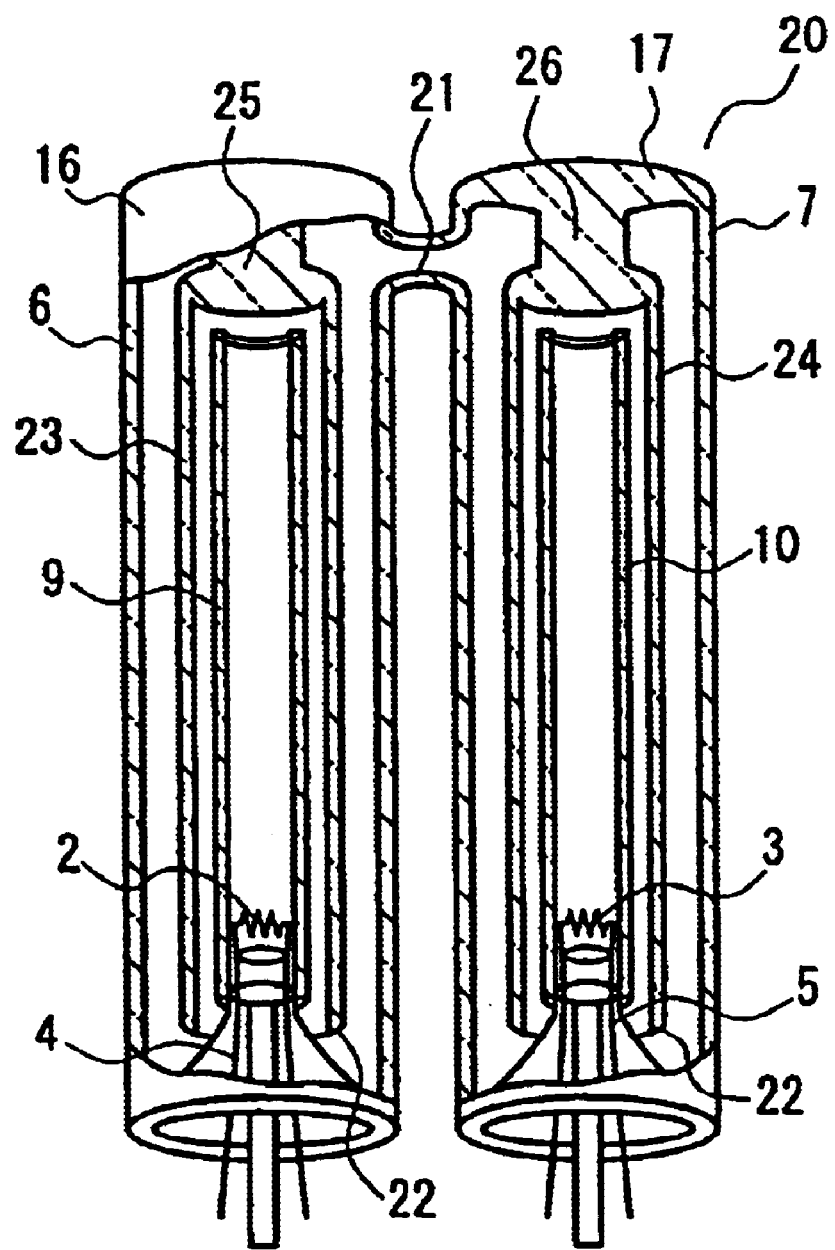
FIG. 9 is a partial cutaway perspective view showing a compact fluorescent lamp according to a second embodiment of the present invention.

FIG. 9 shows a light-emitting tube 20 of a compact fluorescent lamp according to a second embodiment of the present invention. The light-emitting tube 20 has basically the same configuration as the light-emitting tube 1 of the first embodiment, except that first glass inner tubes 9, 10 are inserted into second glass inner tubes 23, 24, and a bridge junction 21 for connecting glass outer tubes 6, 7 is formed at the closed end portion of the glass outer tubes 6, 7. FIG. 9 shows the glass outer tubes 6, 7 as being opaque to make them apparent. Actually, however, the glass outer tubes are transparent.

The second glass inner tubes 23, 24 are supported by sealing their open ends with protrusions 25, 26 that extend from the closed ends of the glass outer tubes 6, 7 to the inside thereof. The other ends 22 of the second glass inner tubes 23, 24 are arranged near stems 4, 5 and remain open. A phosphor (not shown) is applied to the inside and outside surfaces of the second glass inner tubes 23, 24. As with the first embodiment, a phosphor layer (not shown) is applied to the inside and outside surfaces of the first glass inner tubes 9, 10 and the inside surfaces of the glass outer tubes 6, 7. Moreover, as with the first embodiment, the central axes of the first glass inner tubes 9, 10 and the second glass inner tubes 23, 24 are disposed eccentrically from the central axes of the glass outer tubes 6, 7 toward the bridge junction 21.

For the compact fluorescent lamp of this embodiment, the passage of a discharge in the light-emitting tube 20 is as follows: an electrode 2—the first glass inner tube 9—a gap between the first glass inner tube 9 and the second glass inner tube 23—a gap between the second glass inner tube 23 and the glass outer tube 6—the bridge junction 21—a gap between the glass outer tube 7 and the second glass inner tube 24—a gap between the second glass inner tube 24 and the first glass inner tube 10—the first glass inner tube 10—an electrode 3. In other words, the fluorescent lamp with this light-emitting tube configuration can have a longer discharge path for the same lamp length as that of the conventional compact fluorescent lamp in FIG. 10, so that the brightness can be increased further. Moreover, when the brightness is the same, the compact fluorescent lamp of this embodiment can be about one-third the lamp length of the conventional lamp, thus achieving a further reduction in length and size.

Like the light-emitting tube 1 of the first embodiment, coldest points of the light-emitting tube 20 can be provided in the closed ends 16, 17 of the glass outer tubes 6, 7.

The manufacturing process of the light-emitting tube 20 differs from the first embodiment in that one end of each of the glass outer tubes 6, 7, which has been initially open, is closed by stems that serve as the protrusions 25, 26. Specifically, the second glass inner tubes 23, 24 are sealed with the tips of glass stems to be used as the protrusions 25, 26 and inserted into the glass outer tubes 6, 7 so as to surround the first glass inner tubes 9, 10, respectively. Then, the open ends of the glass outer tubes 6, 7 are sealed with the flared (rear) portions of the stems and thus closed.

A 96W type fluorescent lamp according to this embodiment (referred to as a "lamp B of the invention") was produced to measure the lamp characteristics. A light-emitting tube 20 of the lamp B of the invention was formed of components with the following dimensions. Glass outer tubes 6, 7 have a tube outer diameter Do of 28 mm (a tube inner diameter of 26 mm) and a tube length of 300 mm. Second glass inner tubes 23, 24 have a tube outer diameter Di of 20 mm (a tube inner diameter of 18 mm) and a tube length of 260 mm. First glass inner tubes 9, 10 have a tube outer diameter Di of 12 mm (a tube inner diameter of 10.4 mm) and a tube length of 240 mm. The discharge path length of the light-emitting tube 20 having the above dimensions is about 1520 mm. The light-emitting tube was filled with Ar as a buffer inert gas in an amount of 400 Pa. The lamp including a resin base 15, which is similar to that in the first embodiment, has a length of 310 mm as a finished product.

The 96W type lamp B of the invention was operated horizontally by a special electronic ballast at a frequency of 49 kHz, and then the lamp characteristics were measured. The measurement shows that the lamp B of the invention can exhibit excellent lamp characteristics for a compact fluorescent lamp, having a luminous flux of 8800 lm and a lamp efficiency of 91.7 lm/W. In this case, the lamp current was 560 mA. The lamp B of the invention also can achieve the same lamp life (7500 hrs) as that of a conventional 96W type lamp without any reduction and problem.

As described above, a compact fluorescent lamp of each of the embodiments of the present invention can have a much shorter and smaller lamp shape while ensuring the lamp characteristics comparable with those of a conventional lamp.

INDUSTRIAL APPLICABILITY

The present invention further can reduce the length and size of a lamp shape as compared with a conventional compact fluorescent lamp. Moreover, the present invention can achieve the same lamp life as the conventional lamp with even more excellent lamp characteristics. Thus, a compact fluorescent lamp of the present invention can contribute to improvements in energy efficient lighting and lighting design quality.

What is claimed is:

1. A fluorescent lamp comprising:

two glass outer tubes with one end of each closed and the other end of each sealed with stems for supporting electrodes, respectively, wherein a phosphor is applied to an inside surface of each of the glass outer tubes;

a bridge junction for connecting the glass outer tubes at the other end portion to form a discharge space inside the glass outer tubes; and first glass inner tubes provided in the glass outer tubes, respectively, wherein a phosphor is applied to a surface of each of the glass inner tubes, wherein one end of each of the first glass inner tubes is open and disposed at the closed ends of the glass outer tubes, and the other end of each of the first glass inner tubes is sealed with tips of the stems so that the electrodes are positioned in the first glass inner tubes.

2. The fluorescent lamp according to claim 1, wherein the glass inner tubes are disposed eccentrically from central axes of the glass outer tubes toward the bridge junction.

3. A fluorescent lamp comprising:

two glass outer tubes with one end of each closed and the other end of each sealed with stems for supporting electrodes, respectively, wherein a phosphor is applied to an inside surface of each of the glass outer tubes;

a bridge junction for connecting the glass outer tubes at the one end portion to form a discharge space inside the glass outer tubes;

first glass inner tubes provided in the glass outer tube, respectively, wherein a phosphor is applied to a surface of each of the glass inner tubes; and second glass inner tubes provided in the glass outer tubes so that the first glass inner tubes are inserted into the second glass inner tubes, respectively, wherein a phosphor is applied to a surface of each of the second glass inner tubes, wherein one end of each of the first glass inner tubes is open and disposed at the closed ends of the glass outer tubes, the other end each of the first glass inner tubes is sealed with tips of the stems so that the electrodes are positioned in the first glass inner tubes, and ends of the second glass inner tubes are open on the stem side.

4. The fluorescent lamp according to claim 3, wherein protrusions are formed at the insides of the closed end of the glass outer tubes, and the other ends of the second glass inner tubes are sealed with the protrusions.

5. The fluorescent lamp according to claim 2, wherein the glass inner tubes are disposed eccentrically from central axes of the glass outer tubes toward the bridge junction.

* * * * *